US011378479B2

(12) United States Patent
Asselin

(10) Patent No.: US 11,378,479 B2
(45) Date of Patent: Jul. 5, 2022

(54) PRESSURE SWITCH DIAPHRAGM SENSING ELEMENT SUITABLE FOR VACUUM APPLICATIONS

(71) Applicant: Eaton Intelligent Power Limited, Dublin (IE)

(72) Inventor: Marc Asselin, Naugatuck, CT (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 17/110,697

(22) Filed: Dec. 3, 2020

(65) Prior Publication Data

US 2021/0172819 A1    Jun. 10, 2021

Related U.S. Application Data

(60) Provisional application No. 62/944,450, filed on Dec. 6, 2019.

(51) Int. Cl.
*G01L 9/00* (2006.01)
*G01L 19/06* (2006.01)

(52) U.S. Cl.
CPC ........ *G01L 19/0618* (2013.01); *G01L 9/0041* (2013.01)

(58) Field of Classification Search
None
See application file for complete search history.

(56) References Cited

U.S. PATENT DOCUMENTS

| | | | | |
|---|---|---|---|---|
| 3,423,552 A | * | 1/1969 | Sipin | H01H 35/34 200/83 B |
| 3,791,397 A | * | 2/1974 | Janu | G01L 11/006 137/82 |
| 4,046,010 A | * | 9/1977 | Akeley | G01L 9/007 73/706 |
| 4,480,160 A | * | 10/1984 | Stifelman | H01H 35/38 200/82 D |
| 5,034,848 A | * | 7/1991 | Rowlette | G01L 9/0075 361/283.3 |

(Continued)

FOREIGN PATENT DOCUMENTS

| AU | 200012497 A1 | 11/2000 |
|---|---|---|
| CA | 1280291 C | 2/1991 |

(Continued)

OTHER PUBLICATIONS

Extended European Search Report for Application No. 20211119.1 dated Apr. 15, 2021.

*Primary Examiner* — Lisa M Caputo
*Assistant Examiner* — Nigel H Plumb
(74) *Attorney, Agent, or Firm* — Merchant & Gould P.C.

(57) ABSTRACT

A pressure switch includes a diaphragm sensing element disposed within a chamber to sealingly separate switching components from a passage. The diaphragm sensing element includes a convolution section that controls movement of a deflection section between neutral and pressurized positions. The pressure switch includes a reverse stop for limiting travel of the deflection section when exposed to negative pressure. A stationary seal element may be disposed at the reverse stop to further limit exposure of the convolution section of the diaphragm sensing element to negative pressure.

22 Claims, 4 Drawing Sheets

(56) References Cited

U.S. PATENT DOCUMENTS 5,281,782 A * 1/1994 Conatser ................ H01H 35/34
                                                         200/83 B
6,076,409 A * 6/2000 Bang ................... G01L 19/0038
                                                          73/756

FOREIGN PATENT DOCUMENTS

| CN | 104697699 A | 6/2015 |
|---|---|---|
| DE | 10 2014 112 113 A1 | 2/2016 |

* cited by examiner

PRESSURE SWITCH DIAPHRAGM SENSING ELEMENT SUITABLE FOR VACUUM APPLICATIONS

CROSS REFERENCE TO RELATED APPLICATION

This application claims the benefit of provisional application Ser. No. 62/944,450, filed Dec. 6, 2019, which is incorporated herein by reference in its entirety.

BACKGROUND

A pressure switch includes a diaphragm sensing element disposed between a conduit passage and switching components. An actuator of the switching components moves with the diaphragm sensing element as the diaphragm sensing element is flexed between a neutral position and a pressurized position. The switching components are calibrated to transition states and output a switching signal when the actuator travels a predetermined distance. In particular, the switching components are calibrated based on the characteristics (e.g., shape, spring rate, etc.) of the diaphragm sensing element to operate within preset pressure values.

Thin diaphragms commonly used as pressure sensing elements in pressure switch designs are configured to operate unidirectionally with positive pressure applied. The diaphragms are susceptible to damage when subjected to negative pressure. Exposure to negative pressure may lead to a change in diaphragm characteristics, which may ultimately result in the pressure switch failing to operate at the preset values.

In particular, the convolution section of the diaphragm sensing element can deform when the diaphragm sensing element is forced to flex too far from the neutral position. For example, applying negative pressure (e.g., a vacuum) to the diaphragm sensing element via the conduit passage can pull the diaphragm sensing element towards the conduit passage sufficiently far to deform the convolution section. Deforming the convolution section can change the shape and/or spring rate of the convolution section, which may lead to faulty readings from the sensing equipment.

Further developments in such systems are desired.

SUMMARY

Some aspects of the disclosure are directed to a pressure switch that is resistant to exposure to vacuum conditions.

In accordance with certain aspects of the disclosure, the pressure switch includes a diaphragm sensing element including a deflection section that travels between neutral and pressurized positions. The diaphragm sensing element also include a convolution section that allows for repeated travel over a predetermined distance with a high degree of accuracy. A reverse stop limits travel of the deflection section when exposed to negative pressure. A stationary seal element may be disposed at the reverse stop to further limit exposure of the convolution section of the diaphragm sensing element to negative pressure.

In accordance with certain aspects of the disclosure, an example pressure switch includes a method of sensing pressure in a conduit. The method includes automatically sealing a chamber in which a convolution section of the diaphragm sensing element is disposed from the conduit when the conduit is exposed to a vacuum. In certain implementations, a deflection section of the diaphragm sensing element is used to seal the chamber.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Figure 1:
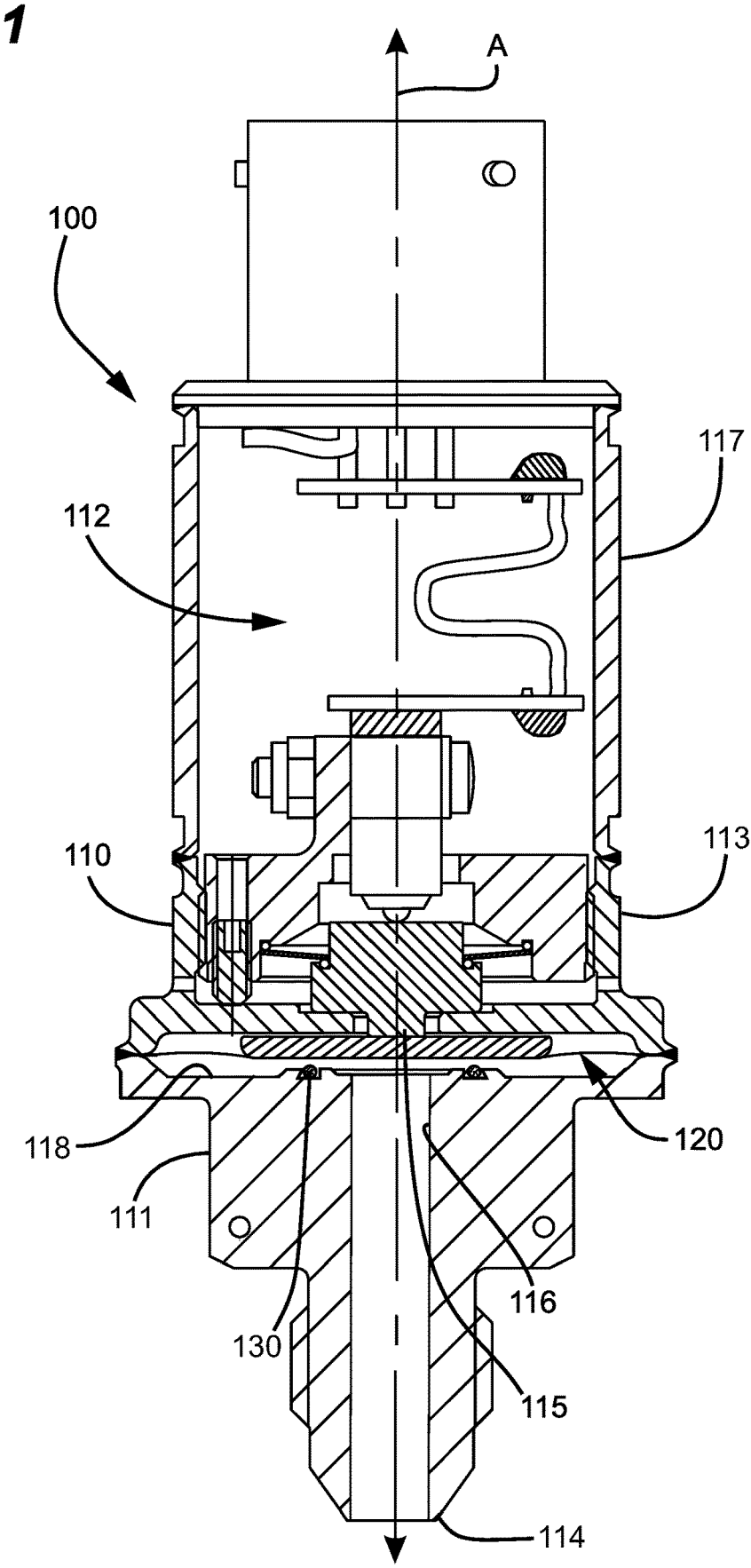
FIG. 1 is a diagram showing a pressure switch with portions shown in cross-section to that interior components—including a diaphragm sensing element and surrounding chamber—are visible.

Reference will now be made in detail to exemplary aspects of the present disclosure that are illustrated in the accompanying drawings. Wherever possible, the same reference numbers will be used throughout the drawings to refer to the same or like parts.

The present disclosure is directed to a pressure switch 100 with a diaphragm sensing element that is resistant to exposure to vacuum conditions. The pressure switch 100 includes a body 110 having a fitting end 114 at which the body 110 attaches to a conduit. The body 110 also holds switching components 112 that outputs a state transition signal. The body 110 also holds a diaphragm sensing element 120 providing a seal between the fitting end 114 of the body 110 and the switching components 112.

In certain implementations, the body 110 includes multiple pieces coupled together. For example, the body 110 may include a fitting 111, a housing 113, and a cover 117 welded or otherwise connected together. In certain examples, the diaphragm sensing element 120 is held between the fitting 111 and the housing 113. In certain examples, the switching components 112 is disposed between the housing 113 and the cover 117. Other configurations are possible.

The body 110 defines a passage 116 leading from the conduit (via the fitting end 114) to the diaphragm sensing element 120. The body 110 defines a chamber 118 between the diaphragm sensing element 120 and the passage 116. Accordingly, media passing through the conduit travels through the passage 116 and into the chamber 118 to apply pressure to the diaphragm sensing element 120. The diaphragm sensing element 120 inhibits contact between the media and the switching components 112. When the media applies pressure to the diaphragm sensing element, the diaphragm sensing element 120 deflects an actuator 115 of the switching components 112 to transition the states of the switching component.

Figure 2:
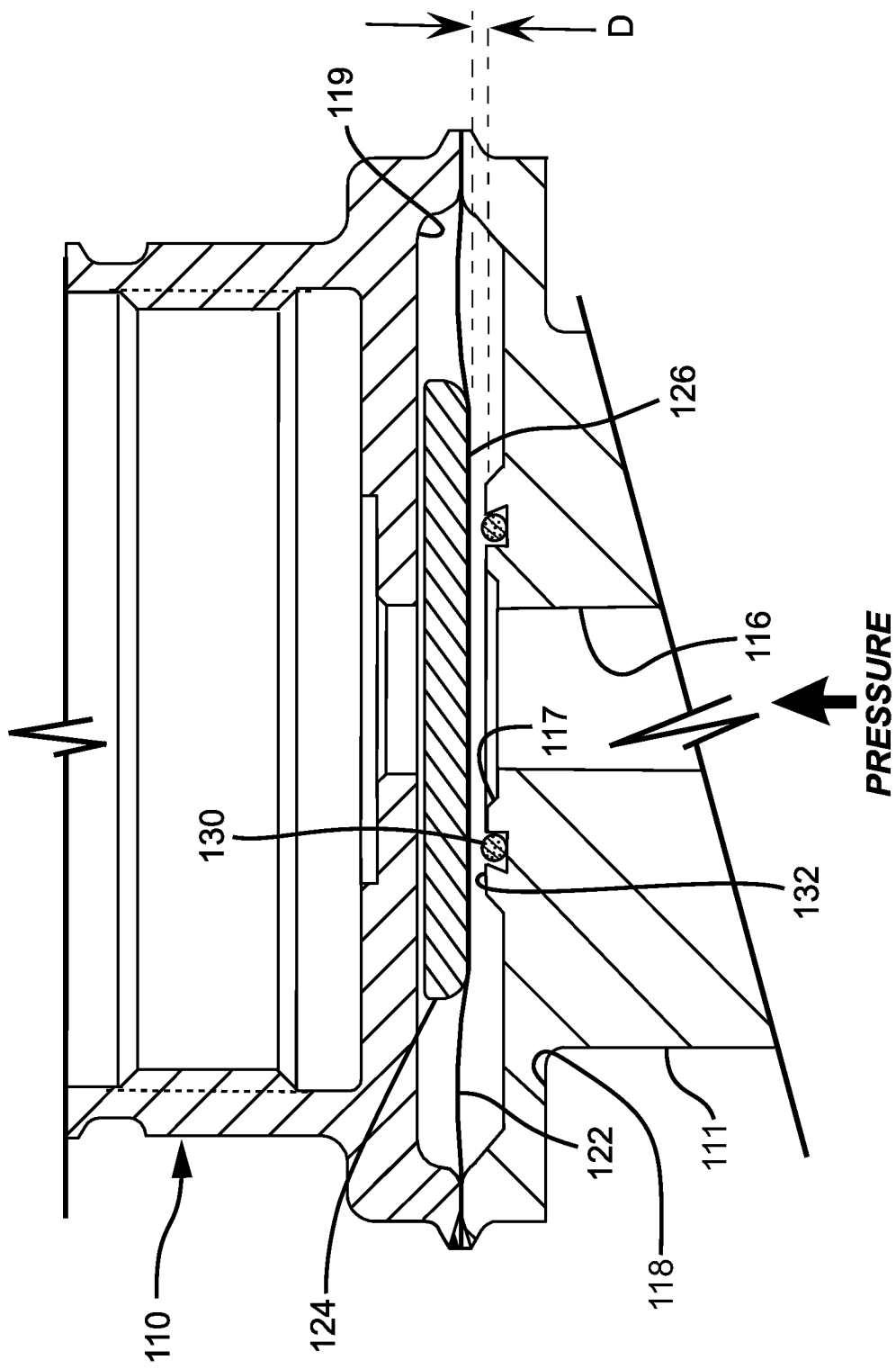
FIG. 2 is an enlarged view of the diaphragm sensing element and surrounding chamber of FIG. 1 with the diaphragm sensing element shown in a neutral state.
Figure 3:
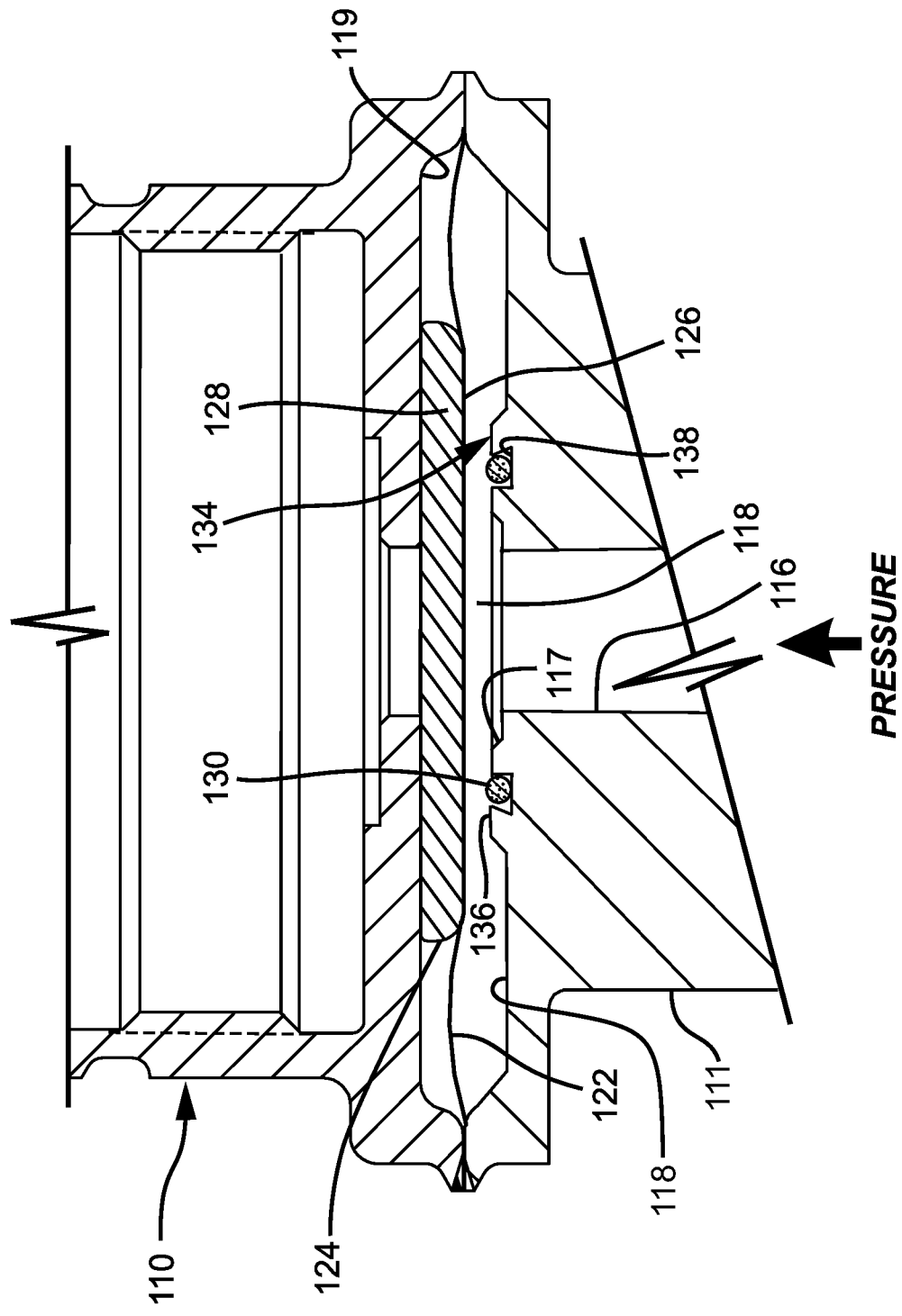
FIG. 3 is an enlarged view of the diaphragm sensing element and surrounding chamber of FIG. 1 with the diaphragm sensing element shown in a pressurized state.

The diaphragm sensing element 120 is flexible relative to the body 110 between a neutral state (FIG. 2) and a pressurized state (FIG. 3). The diaphragm sensing element 120 may be disposed in a neutral state when exposed to ambient pressure (e.g., when no media is conveyed through the conduit or the media is not pressurized). When in the neutral state, the diaphragm sensing element 120 allows the media to enter the chamber 118 from the passage 116.

The diaphragm sensing element 120 is flexed to the pressurized state when a positive pressure is applied (e.g., via media conveyed through the passage 116). Flexing the diaphragm sensing element 120 to the pressurized state moves the actuator 115 of the switching components 112. When in the pressurized state, the diaphragm sensing element 120 abuts a hard stop 119 within the body 110 to prohibit further travel/flexing of the diaphragm sensing element 120 away from the passage 116. The diaphragm sensing element 120 allows media to be retained within the chamber 118 and the passage 116 when disposed in the pressurized state.

The diaphragm sensing element 120 also can be flexed to a sealed state (FIG. 4) when exposed to negative pressure (i.e., a vacuum) via the conduit. For example, negative pressure may result when the conduit is purged, de-iced, etc. When in the sealed state, the diaphragm sensing element 120 abuts a reverse pressure stop 132 at which the diaphragm sensing element 120 seals to the body 110. Accordingly, the diaphragm sensing element 120 prohibits the draw of media between the chamber 118 and the passage 116 when disposed in the sealed state. The seal also protects the diaphragm sensing element 120 against deformation that could change the diaphragm characteristics.

In certain implementations, the diaphragm sensing element 120 includes a convolution section 122 extending outwardly from a deflection section (e.g., a button) 124. The deflection section 124 travels along a deflection axis A (FIG. 1) between a neutral position (FIG. 2) and a pressurized position (FIG. 3) as the convolution section 122 flexes. The actuator 115 of the switching components 112 is in contact with the deflection section 124. The switching components 112 (and hence the pressure switch 100) is actuated upon movement of the deflection section 124 between the neutral position and the pressurized position.

When the deflection section 124 is in the neutral position, the curvature of the convolution section 122 has a preset spring rate that controls movement of the deflection section 124 along the deflection axis A when the diaphragm sensing element 120 is exposed to pressure (e.g., positive pressure or negative pressure). The hard stop 119 is positioned sufficiently close to the neutral position of the deflection member 124 to limit travel between the neutral and pressurized positions. Limiting the travel prevents deformation of the convolution section 122 of the diaphragm sensing element 120.

The deflection section 124 also travels along the deflection axis A between the neutral position and a sealed position (FIG. 4) when exposed to negative pressure. Negative pressure pulls the deflection section 124 along the deflection axis A towards the passage 116.

Figure 4:
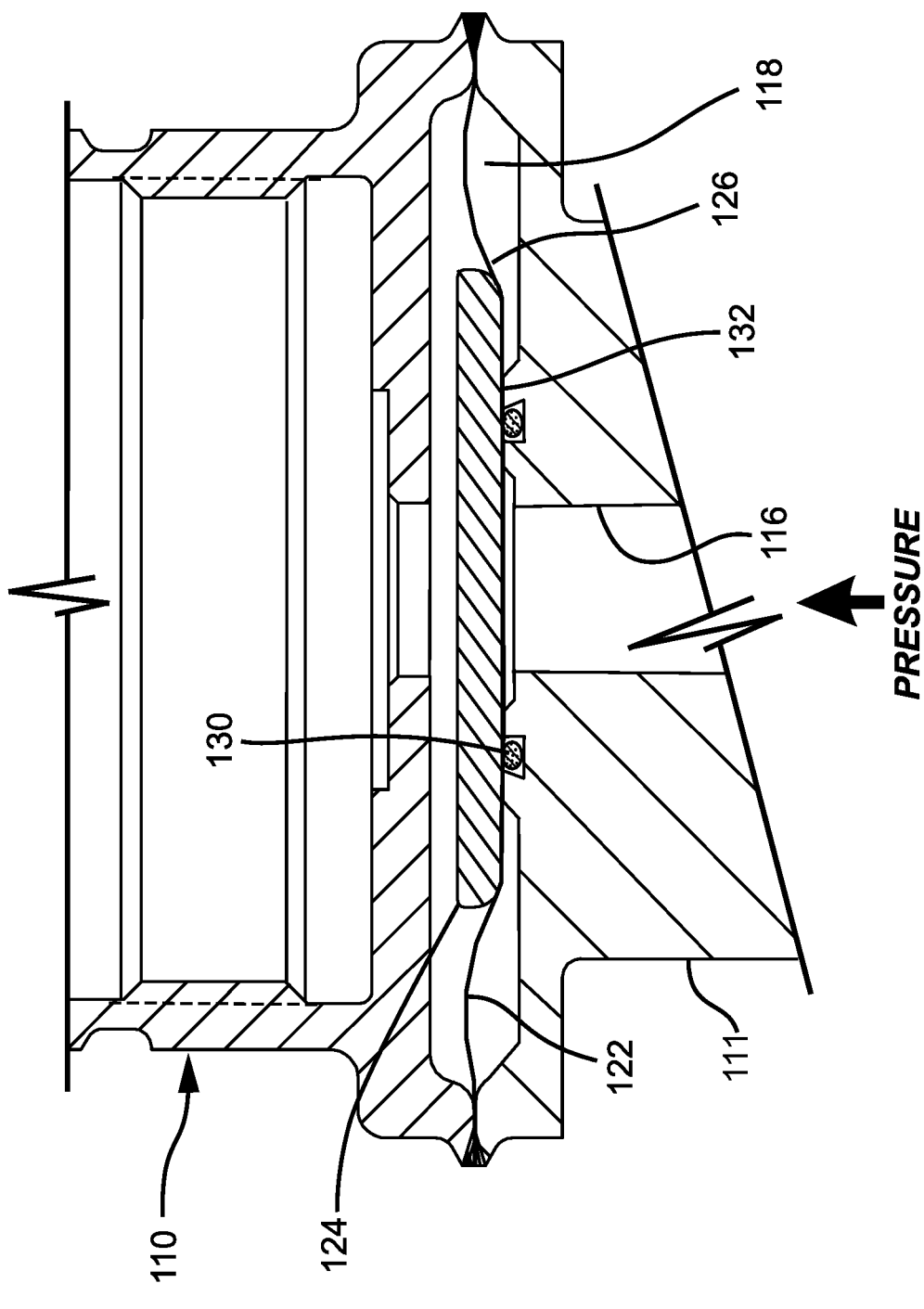
FIG. 4 is an enlarged view of the diaphragm sensing element and surrounding chamber of FIG. 1 with the diaphragm sensing element shown in a sealed (applied vacuum) state.

As shown in FIG. 4, a reverse pressure stop 132 is disposed at an opposite side of the diaphragm sensing element 120 from the hard stop 119. The reverse pressure stop 132 is disposed within the chamber 118. The reverse pressure stop 132 is positioned sufficiently close to the neutral position of the deflection member 124 to inhibit sufficient travel between the neutral and sealed positions to deform the convolution section 122 of the diaphragm sensing element 120. For example, the reverse pressure stop 132 is positioned at a distance D (FIG. 2) from the deflection section 124 of the diaphragm sensing element 120 when the deflection section 124 is disposed in the neutral position.

In certain implementations, a seal element 130 is disposed at the reverse pressure stop 132 within the chamber 118. In an example, the seal element 130 includes an o-ring. Other types of seals are possible. The seal element 130 abuts the deflection section 124 of the diaphragm sensing element 120 when the diaphragm sensing element is disposed in the sealed state (i.e., when the deflection section 124 is disposed in the sealed position). The abutment between the deflection section 124 and the seal element 130 forms a seal that prevents the negative pressure from continuing to be applied within the chamber 118 beyond the seal element 130. In certain examples, the negative pressure pulls the deflection section 124 tight against the seal element 130, which aids in maintaining the seal while the vacuum state exists.

The seal element 130 remains stationary relative to the body 110 as the deflection section 124 of the diaphragm sensing element 120 travels along the deflection axis A. The deflection section 124 of the diaphragm sensing element 120 is spaced from the seal element 130 when in the neutral or pressurized positions and seals against the seal element 130 when in the sealed position. In certain examples, the seal element 130 contacts only the deflection section 124 and not the convolution section 122 when the diaphragm sensing element 120 is disposed in the sealed state.

The seal element 130 surrounds an open end 117 (FIG. 3) of the passage 116. Accordingly, the seal between the seal element 130 and the deflection section 124 of the diaphragm sensing element 120 inhibits media loss between the passage 116 and the chamber 118. For example, the seal inhibits the vacuum from applying a negative pressure against the convolution section 122 of the diaphragm sensing element 120.

In certain implementations, the reverse pressure stop 132 includes a raised ring 134 surrounding the open end 117 of the passage 116. In certain examples, the raised ring 134 has a flat top 136 against which the deflection section 124 of the diaphragm sensing element 120 abuts when disposed in the sealed position. In certain implementations, the raised ring 134 defines an annular channel 138 in which the seal element 130 is disposed. In certain examples, the seal element 130 protrudes out from the annular channel 138 when the deflection section 124 of the diaphragm sensing element 120 is disposed in the neutral or pressurized positions, but deforms into the annular channel 138 when compressed by the deflection section 124 in the sealed position.

In certain implementations, the diaphragm sensing element 120 includes a diaphragm 126 and a button 128 carried by the diaphragm 126. The diaphragm 126 forms the convolution section 122 of the diaphragm sensing element 120. The button 128 is coupled to the diaphragm 126 (e.g., at a central region of the diaphragm 126). The button 128 is stiffer and thicker than the diaphragm 126. The button 128 and the corresponding region of the diaphragm 126 form the deflection section 124 of the diaphragm sensing element 120. The button contacts and acts upon the actuator 115 of the switching components 112 as the diaphragm sensing element 120 transitions from the neutral state to the pressurized state.

In certain examples, the diaphragm 126 is a thin, resilient sheet of material having a passage side and a switching component side. The button 128 is coupled to the switching component side of the diaphragm 126. Media within the chamber 118 contacts the passage side of the diaphragm. The diaphragm 126 inhibits any media from passing between the passage and equipment sides. In an example, the diaphragm 126 is formed from stainless steel. In other examples, the diaphragm can be formed from other metals, plastic, rubber, or other materials.

In certain implementations, the button 128 has a cross-dimension (e.g., diameter) that is larger than a cross-dimension (e.g., diameter) of the passage 116. In certain implementations, the cross-dimension of the button 128 is larger than a cross-dimension (e.g., diameter) of the seal element 130. In certain implementations, the button 128 is coaxially aligned with the seal element 130. In certain implementations, the button 128 is coaxially aligned with the passage 116 (or at least the portion of the passage 116 at the open end 117).

Because the diaphragm 126 extends fully across the chamber 118, the diaphragm 126 also separates the button 128 from the passage side of the chamber 118. Accordingly, the diaphragm 126 (e.g., the central region of the diaphragm 126) directly contacts the seal element 130 when the button 128 is disposed in the sealed position. The button 128 stiffens the diaphragm 126 at the deflection section 124 sufficient to form a seal against the seal element 130.

In certain implementations, the button 128 is attached to the diaphragm 126 at a coupling region (e.g., a ring of spot welds). In certain implementations, the button 128 and seal element 130 are sized so that a region of contact between the diaphragm 126 and seal element 130 when the diaphragm sensing element 120 is disposed in the sealed state does not align with the coupling region.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A pressure switch comprising:
  a body defining a passage leading from a first fitting end of the body to a chamber, the body holding a switching component;
  a seal element disposed within the chamber and surrounding an open end of the passage, the seal element being held fixed relative to the body; and
  a diaphragm sensing element disposed within the chamber to sealingly separate the switching component from the passage, the diaphragm sensing element having a convolution section extending outwardly from a deflection section, the deflection section traveling along a deflection axis between a pressurized position and a sealed position as the convolution section flexes within the chamber, wherein the deflection section of the diaphragm sensing element is spaced from the seal element when in the pressurized position and seals against the seal element when in the sealed position.

2. The pressure switch of claim 1, wherein the switching component is operatively coupled to the diaphragm sensing element within the chamber.

3. The pressure switch of claim 2, wherein the deflection section of the diaphragm sensing element is movable to a neutral position between the sealed and pressurized positions, and wherein the switching component includes an actuator that extends into the chamber and contacts the deflection section of the diaphragm sensing element so that the actuator moves along the deflection axis as the diaphragm sensing element flexes between the neutral and pressurized positions.

4. The pressure switch of claim 3, wherein the diaphragm sensing element includes a diaphragm that extends across the chamber and a button that is carried with the diaphragm as the diaphragm flexes relative to the body, the button forming part of the deflection section of the diaphragm sensing element.

5. The pressure switch of claim 4, wherein the button is attached to the diaphragm at a coupling region; and wherein the seal element does not align with the coupling region along a reference axis parallel to the deflection axis.

6. The pressure switch of claim 1, wherein the seal element is an o-ring.

7. The pressure switch of claim 1, wherein the body defines a raised ring within the chamber, the raised ring surrounding the open end of the passage, the raised ring holding the seal element fixed relative to the body.

8. The pressure switch of claim 7, wherein the raised ring defines an annular channel in which the seal element is disposed.

9. The pressure switch of claim 7, wherein the raised ring has a flat top that abuts the center region of the diaphragm sensing element when the center region is disposed in the sealed position.

10. The pressure switch of claim 7, wherein the seal element is an o-ring.

11. The pressure switch of claim 1, wherein the deflection section of the diaphragm sensing element is disposed in a neutral position when exposed to ambient pressure, the neutral position being located between the pressurized and sealed positions, wherein a travel distance between the neutral position and the sealed position is sufficiently short so as to inhibit deformation of the convolution section when the deflection section is moved from the neutral position to the sealed position.

12. The pressure switch of claim 1, wherein the body defines a hard stop to limit movement of the deflection section of the diaphragm sensing element along the deflection axis away from the passage; wherein the deflection section contacts the hard stop when the deflection section is disposed in the pressurized position.

13. The pressure switch of claim 1, wherein the diaphragm sensing element includes a diaphragm and a button carried by the diaphragm, the diaphragm has a passage side and a switching component side, the button is coupled to the switching component side of the diaphragm.

14. The pressure switch of claim 13, wherein media within the chamber contacts the passage side of the diaphragm; and the diaphragm directly contacts the seal element when the button is disposed in the sealed position.

15. A pressure sensing system comprising:
  a conduit for conveying media;
  a pressure switch body having a fitting end coupled to the conduit, the pressure switch body defining a passage in communication with the conduit; and
  a diaphragm sensing element disposed within the pressure switch body and defining a chamber between the diaphragm sensing element and the passage, the diaphragm sensing element being flexible relative to the pressure switch body between a pressurized state and a sealed state, the diaphragm sensing element being flexed to the pressurized state when exposed to a pressurized media conveyed through the conduit, the diaphragm sensing element being flexed to the sealed state when exposed to a vacuum via the conduit and the passage, the diaphragm sensing element contacting media within the chamber when disposed in the pressurized state, the diaphragm sensing element prohibiting a media draw between the chamber and the passage when disposed in the sealed state.

16. The pressure sensing system of claim 15, further comprising a seal element against which the diaphragm sensing element abuts when in the sealed state to prohibit the media draw between the chamber and the passage.

17. The pressure sensing system of claim 16, wherein the seal element is disposed within the chamber.

18. The pressure sensing system of claim 16, wherein the seal element is disposed in a fixed position relative to the pressure switch body while the diaphragm sensing element is flexing between the pressurized and sealed states.

19. The pressure sensing system of claim 16, wherein the seal element is an o-ring.

20. A method of sensing pressure in a conduit comprising:
diverting media passing through the conduit into a chamber bounded by a diaphragm sensing element;
actuating a switch component to indicate a presence of pressure within the conduit based on the deflection of the diaphragm sensing element; and
automatically sealing the chamber from the conduit with the diaphragm sensing element when the conduit is exposed to a vacuum.

21. The method of claim 20, wherein the chamber is sealed before the vacuum deforms a convolution section of the diaphragm seal, the convolution section extending outwardly from a button.

22. The method of claim 20, wherein automatically sealing the chamber comprises disposing a seal element at an entrance to the chamber so that the vacuum pulls the diaphragm sensing element against the seal element to seal the chamber.

* * * * *